United States Patent [19]
Ohsawa et al.

[11] Patent Number: 6,132,651
[45] Date of Patent: Oct. 17, 2000

[54] MAGNETIC RECORDING MEDIUM AND PROCESS FOR PRODUCING SAME

[75] Inventors: Hiroshi Ohsawa; Hiroyuki Watanabe, both of Ichihara, Japan

[73] Assignee: Showa Denko K.K., Chiba, Japan

[21] Appl. No.: 09/329,329

[22] Filed: Jun. 10, 1999

Related U.S. Application Data

[62] Division of application No. 08/941,295, Sep. 30, 1997, Pat. No. 5,973,894.

[30] Foreign Application Priority Data

Oct. 4, 1996 [JP] Japan .................................. 8-264230

[51] Int. Cl.$^7$ .............................. G11B 5/82; B29D 17/00
[52] U.S. Cl. .................................... 264/1.33; 219/121.69; 264/1.37; 264/400; 425/174.4; 425/810
[58] Field of Search ................................ 264/1.33, 1.37, 264/400, 482, 106, 107; 425/810, 174.4; 360/135; 219/121.61, 121.69, 121.74

[56] References Cited

U.S. PATENT DOCUMENTS

| | | | |
|---|---|---|---|
| 5,062,021 | 10/1991 | Ranjan et al. ........................... | 360/135 |
| 5,567,484 | 10/1996 | Baumgart et al. . | |
| 5,595,768 | 1/1997 | Treves et al. ........................... | 264/400 |
| 5,595,791 | 1/1997 | Baumgart et al. . | |
| 5,783,797 | 7/1998 | Xuan et al. .............................. | 264/400 |
| 5,863,473 | 1/1999 | Ohsawa et al. ......................... | 264/1.37 |
| 6,004,487 | 12/1999 | Wada et al. ............................. | 264/1.37 |

FOREIGN PATENT DOCUMENTS 652 554  5/1995  European Pat. Off. .

*Primary Examiner*—Mathieu D. Vargot
*Attorney, Agent, or Firm*—Sughrue, Mion, Zinn, Macpeak & Seas, PLLC

[57] ABSTRACT

A magnetic recording medium having a substrate disc with microscopic bumps formed by focusing a laser beam, wherein spacings D between adjacent bumps in the circumferential direction of the disc are varied so that formula (1) is satisfied:

$$1 \leq [(D_{max} - D_{min})/D_{avg}] \times 100(\%) \leq 200 \qquad (1)$$

wherein $D_{max}$, $D_{min}$ and $D_{avg}$ are the maximum, minimum and average spacings, respectively, as determined by a method wherein 2.5% of the total number of spacings D, having the largest dimensions, and 2.5% of the total number of spacings D, having the smallest dimensions, are excluded; and $D_{max}$, $D_{min}$ and $D_{avg}$ are measured on the remaining 95% of the total number of spacings D. The variation of bump spacings is attained, for example, by (i) modulating the pulse repetition frequency F of laser beam so that the ratio of "$(F_{max} - F_{min})/F_{avg}$" is maintained within the range of 0.01 to 100, wherein $F_{max}$, $F_{min}$ and $F_{avg}$ are the maximum, minimum and average values, respectively, of the F of laser beam; (ii) by transmitting the laser beam through a mask having perforations, wherein spacings between adjacent perforations in the mask are varied, i.e., not constant; or (iii) by reflecting the laser beam by mirrors working at a continuously varied reflection angle.

5 Claims, No Drawings

MAGNETIC RECORDING MEDIUM AND PROCESS FOR PRODUCING SAME

This is a divisional of application Ser. No. 08/941,295 filed Sep. 30, 1997, now U.S. Pat. No. 5,973,894, the disclosure of which is incorporated herein by reference.

BACKGROUND OF THE INVENTION (1) Field of the Invention

This invention relates to a magnetic recording medium comprising a substrate disc having formed thereon a magnetic recording layer, and a process for producing the magnetic recording medium. More particularly, it relates to an improvement in a magnetic recording medium comprising a substrate disc having formed thereon a magnetic recording layer, said substrate disc having a multiplicity of microscopic bumps on the surface thereof formed by texturing the substrate surface by focusing a laser beam; and to an improvement in a process for producing the magnetic recording medium.

The magnetic recording medium of the present invention exhibits good CSS (contact start-stop) characteristics and a reduced head noise, and thus, has an enhanced durability against wear due to sliding contact of a magnetic hard disc (hereinafter abbreviated to "HD") with a magnetic head.

(2) Description of the Related Art

The recent progress of increasing the density of magnetic recording medium is remarkable. It has heretofore said that the rate of increase in the recording density of hard disc drives (hereinafter abbreviated to "HDD") is about 10 times per 10 years, but now it may be said that the rate of density increase is about 100 times per 10 years.

In HDD, there is adopted mainly a Winchester system, i.e., CSS (contact start--stop) system involving a basic operation of a sliding movement due to contact of HD with a magnetic head, floating of the head above HD and then a sliding movement due to contact of HD with the head. The CSS system has contributed in no small measure to the amazing progress in increase of recording density. However, this system has invited an attractive problem of tribology. More specifically, the amazing progress in increase of recording density has invited an increase of revolving speed of the disc and a reduction of a flying height of the magnetic head. Therefore, there is now an increasing demand for improving head-and-disc wear characteristics and stability in sliding movement, and for enhancing smoothness of the HD surface.

The key to the improvement of head-and-disc-wear characteristics lies in an increase of the tenacity of materials and a lowering of friction coefficient or an enhancement of lubrication. As regards HD, attempts have been made for lowering the friction coefficient by rendering rough the HD surface, and for coating the HD with a protective coating material such as diamond-like carbon (DLC) or a coating lubricating agent. The surface treatment for lowering the friction coefficient is referred to as "texturing treatment" and is intended to effectively reduce the contact area in the CSS system whereby the head-and-disc wear characteristics are improved. The texturing treatment comprises forming a multiplicity of bumps having peaks and indentations or valleys with predetermined height and depth on the textured HD surface, and now the texturing treatment is an essential step for the HD production.

The texturing treatment greatly depends upon the particular material of the substrate disc. For example, in the case of an aluminum disc blank having a nickel-phosphorus (NiP) coating, the surface roughening is generally effected by mechanical polishing using an abrasive grain. In the case of a glass substrate, an etching technique utilizing lithography or a combination of lithography with printing have been proposed and some of the proposed techniques have been practically adopted.

In the texturing treatment, there are problems inconsistent with each other, namely, it is difficult to precisely control the surface roughness with an enhanced production efficiency. For example, the mechanical abrasion has technical problems of over-abrasion or burr occurrence, and blurring of textured areas, and the lithographic etching has a problem that the production steps are complicated.

In recent years a texturing treatment utilizing laser beam such as laser ablation and laser etching have attracted attention (see, for example, U.S. Pat. No. 5,062,021 and Japanese Unexamined Patent Publication (hereinafter abbreviated to "JP-A") 62-209,788, 3-272018 and 7-182655). The laser beam texturing is advantageous in that, first, the surface roughness of substrate can be precisely controlled, namely, the height, spacing and location of microscopic bumps created by laser beam focusing can be desirably controlled, and, secondly, the production steps are carried out in a dry state without use of any liquid and thus the HD production can be conducted without contamination of the working environment. For example, U.S. Pat. No. 5,062,021 discloses creation of crater-like bumps each comprised of a circular rim surrounding a pit and having a diameter of 2.5 to 100 $\mu$m and a spot spacing of 12.7 to 25.4 $\mu$m on an NiP-coated aluminum substrate by using a Q-switched pulse oscillating Nd-YAG laser with a wavelength of 1,064 nm and an oscillation frequency of 12 KHz.

But, the laser beam texturing has problems such that, when the preset height and spacing of bumps are not adequate, the adsorption of the magnetic head onto the disc surface and the CSS characteristics are markedly deteriorated.

The spacing between adjacent microscopic bumps in the circumferential direction of the substrate disc is usually constant, but natural oscillation undesirably occurs between the magnetic head and the bumps due to the bump spacings and the linear speed of the rotating disc in the circumferential direction thereof. The frequency of natural oscillation equals to integral number times of the circumferential speed/ bump spacing ratio. Further, the magnetic head has a frequency of natural oscillation, and, when the frequency of natural oscillation of the magnetic head, is equal to integral number times of the frequency of natural oscillation, resonance occurs.

The occurrence of resonance leads to reduction in flying stability of a glide head for inspecting unacceptable bumps on the disc surface with the result of increase of a head noise and failure of inspecting the normal glide height, and further, it leads to deterioration of CSS (contact start-stop) characteristics.

When a laser beam is focused with a constant pulse repetition frequency, the spacing between adjacent microscopic bumps in the circumferential direction of the substrate disc varies in the radial direction. Namely, the bump spacings in outer circumferences of the substrate disc are larger than those in inner circumferences thereof. However, the bump spacings in the same circumferences are equal and thus, the above-mentioned problems occur.

SUMMARY OF THE INVENTION

In view of the foregoing, a primary object of the present invention is to provide a magnetic recording medium comprising a substrate disc having a multiplicity of microscopic bumps on the surface thereof formed by texturing the substrate surface by focusing a laser beam, which is characterized by minimized occurrence of the undesirable natural oscillation caused by the linear speed in the circumferential direction and the bump spacing, and thus, minimized occurrence of resonance between the magnetic recording medium and a magnetic head, and, which exhibits good CSS characteristics and a reduced head noise, and thus, has an enhanced durability against wear due to sliding contact of the disc with the magnetic head.

Another object of the present invention is to provide a process for producing a magnetic recording medium including a step of laser-texturing a substrate surface to form a multiplicity of microscopic bumps, by which microscopic bumps having desired varied spacings between adjacent bumps are formed on the substrate surface, and thus, the magnetic recording medium having the above-mentioned benefits can be produced.

In one aspect of the present invention, there is provided an improvement in a magnetic recording medium comprising a substrate disc having formed thereon a magnetic recording layer, said substrate disc having a multiplicity of microscopic bumps on the surface thereof formed by texturing the substrate surface by focusing a laser beam. The improvement lies in that the spacings D between adjacent microscopic bumps in the circumferential direction of the substrate disc are varied to an extent such that the following formula (1) is satisfied:

$$1 \leq [(D_{max}-D_{min})/D_{avg}] \times 100(\%) \leq 200 \quad (1)$$

wherein $D_{max}$, $D_{mim}$ and $D_{avg}$ are the maximum spacing, minimum spacing and average spacing, respectively, among the spacings D between adjacent microscopic bumps in the circumferential direction of the substrate disc, as determined by a method wherein 2.5% of the total number of spacings D, having the largest dimensions, and 2.5% of the total number of spacings D, having the smallest dimensions, are excluded, and $D_{max}$, $D_{min}$ and $D_{avg}$ are measured on the remaining 95% of the total number of spacings D.

In another aspect of the present invention, there is provided an improvement in a process for producing a magnetic recording medium comprising a step of focusing a laser beam for texturing a substrate disc to form a multiplicity of microscopic bumps on a surface of the substrate disc. The improvement lies in that the focusing of the laser beam is carried out in a manner such that the spacings D between adjacent microscopic bumps in the circumferential direction of the substrate disc are varied to an extent such that the following formula (1) is satisfied:

$$1 \leq [(D_{max}-D_{min})/D_{avg}] \times 100(\%) \leq 200 \quad (1)$$

wherein $D_{max}$, $D_{min}$ and $D_{avg}$ are as defined above.

The above-mentioned variation of the spacings D between adjacent microscopic bumps in the circumferential direction of the substrate disc is attained preferably by (i) a method wherein the pulse repetition frequency F of laser beam to be focused onto the disc surface is modulated in a manner such that the following formula (2) is satisfied:

$$0.01 \leq [(F_{max}-F_{min})/F_{avg}] \leq 100 \quad (2)$$

wherein $F_{max}$, $F_{min}$ and $F_{avg}$ are the maximum value, the minimum value and the average value, respectively, of the pulse repetition frequency of laser beam; or (ii) a method wherein the laser beam is transmitted through a mask having perforations, wherein spacings between adjacent perforations in the mask are varied in a specific range; or (iii) a method wherein the laser beam is reflected by mirrors working at a continuously varied reflection angle.

DESCRIPTION OF THE PREFERRED EMBODIMENTS

The magnetic recording medium of the present invention is characterized by the microscopic bumps having the spacings D between adjacent microscopic bumps in the circumferential direction of the substrate disc, which spacings D are varied to an extent such that the above-mentioned formula (1) is satisfied. By the term "bump spacing D" used herein we mean the distance between the center of a microscopic bump and the center of an adjacent microscopic bump.

In the formula (1), the maximum spacing ($D_{max}$), the minimum spacing ($D_{min}$) and the average spacing ($D_{avg}$) are determined by a method wherein 2.5% of the total number of spacings D, having the largest dimensions, and 2.5% of the total number of spacings D, having the smallest dimensions, are excluded; and $D_{max}$, $D_{min}$ and $D_{avg}$ are measured on the remaining 95% of the total number of spacings D.

If the bump spacing variation expressed by the formula $[(D_{max}-D_{min})/D_{avg}] \times 100$ (%) is smaller than the lower limit (i.e., 1%) of the range expressed by the formula (1), the intended improvement of CSS characteristics and reduction of head noise cannot be attained. In contrast, if the bump spacing variation exceeds the upper limit (i.e., 200%) of the range expressed by the formula (1), i.e., the bump spacings are varied to an unduly large extent, the glide noise is increased. The bump spacing variation expressed by the formula $[(D_{max}-D_{min})/D_{avg}] \times 100$ (%) is preferably in the range of 10% to 150%.

One preferable method (i) of controlling the bump spacing variation expressed by the formula "$[(D_{max}-D_{min})/D_{avg}] \times 100$ (%)" within the range of 1% to 200% comprises modulating the pulse repetition frequency F of laser beam to be focused onto the surface of the substrate disc.

In the case of a continuous wave (CW) laser, the modulation of the pulse repetition frequency F of laser beam can be effected by using an external modulator such as an electro-optic modulator (hereinafter abbreviated to "EOM") and an acoustic-optic modulator (hereinafter abbreviated to "AOM").

EOM has a function of continuously varying the output of laser beam due to the fact that, when a voltage is imposed to an optical crystal, the optical path of incident laser beam is varied by the electro-optic effect of the optical crystal. AOM has a function of continuously varying the output of a rectilinearly propagated laser beam due to the fact that, when an optical crystal is irradiated with an ultrasonic wave, the diffraction angle of continuously oscillating laser beam is varied by the photoelastic effect of the optical crystal. Both EOM and AOM enable to modulate the laser beam output at a frequency of the order of MHz by a signal from the exterior such as the ultrasonic wave or the electric pulse, and the degree of modulation of the laser beam output can freely be varied with ease.

The modulation of the pulse repetition frequency F of laser beam is preferably carried out in a manner such that following formula (2) is satisfied:

$$0.01 \leq [(F_{max}-F_{min})/F_{avg}] \leq 100 \quad (2)$$

wherein $F_{max}$, $F_{min}$ and $F_{avg}$ are the maximum value, the minimum value and the average value, respectively, of the pulse repetition frequency F of laser beam. The procedure of modulating the pulse repetition frequency F of laser beam so as to satisfy the formula (2) is not particularly limited, and any wave-form of a triangular wave, a square wave, a sinusoidal wave, a pulse wave and a random wave can be employed.

The focusing of laser beam onto the disc surface is carried out while at least one of the substrate disc and a system for focusing the modulated laser beam is moved so that relative positions of the substrate disc and the laser-focusing system vary correlatively in the radial direction of the substrate disc. Further, the substrate disc is usually rotated at a constant angular speed or, at a speed such that the focusing spot on the disc surface is moved in the circumferential direction of the substrate disc at a constant linear speed relative to the revolving substrate disc.

In the case where the substrate disc is rotated at a speed such that the focusing spot on the disc surface is moved in the circumferential direction of the substrate disc at a constant linear speed relative to the revolving substrate disc, when the pulse width and pulse intensity are constant, the heights of microscopic bumps formed on the disc surface can be uniform.

In the case where the substrate disc is rotated at a constant angular speed, when the pulse width and the pulse intensity are constant, the heights of microscopic bumps formed on the disc surface are not uniform because the linear speed of the focusing point relative to the rotating substrate disc in the circumferential direction thereof increases as the focusing point moves outward in the radial direction. That is, the height of microscopic bumps continuously increases or decreases as the focusing point moves outward in the radial direction. However, the height of microscopic bumps can be uniform by modulating the pulse width or the pulse intensity.

In the case of a pulse laser, the modulation is effected by a Q-switch with EOM or AOM, which is built in a cavity of the laser. Thus, the pulse repetition frequency F can be modulated so as to satisfy the above-mentioned formula (2) by an external signal instead of the pulse-controlling signal from the cavity of laser. In the case of the Q-switched pulse laser, the upper limit of the pulse repetition frequency is approximately 100 MHz, namely, smaller than that of EOM or AOM, due to the Q-switch. But, the pulse laser is advantageous in that the bump spacings can be controlled by the cavity of laser without use of an external modulator, although the bump density is small.

In another method (ii) of attaining the above-mentioned variation of the spacings D between adjacent microscopic bumps in the circumferential direction of the substrate disc, which is represented by formula (1), a laser beam is reflected by an optical system having mirrors working at a continuously varied reflection angle and the reflected laser beam is focused on a stationary substrate, wherein the reflection angle of the mirrors is controlled so that the bump spacings D satisfying the requirements expressed by the formula (1) are formed. In this method, a two-dimensional texturing is usually effected by using two mirrors, one of which works in the X axial direction on the disc surface and the other of which works in the Y axial direction. In other words, the bump spacings D can be continuously varied by continuously varying the working rate in the X and Y axial directions.

In still another method (ii) of attaining the above-mentioned variation of the spacings D between adjacent microscopic bumps in the circumferential direction of the substrate disc, which is represented by formula (1), a laser is transmitted through perforations of a mask and then focused onto a surface of a substrate disc. In this method, the perforations of the mask are characterized as having spacings D' between the adjacent perforations in the circumferential direction of the mask, which are varied to an extent such that the following formula (4) is satisfied:

$$1 \leq [(D'_{max} - D'_{min})/D'_{avg}] \times 100(\%) \leq 200 \qquad (4)$$

wherein $D'_{max}$, $D'_{min}$ and $D'_{avg}$ are the maximum spacing, minimum spacing and average spacing, respectively, among the spacings D' between adjacent perforations in the circumferential direction of the mask, as determined by a method wherein 2.5% of the total number of spacings D', having the largest dimensions, and 2.5% of the total number of spacings D', having the smallest dimensions, are excluded, $D'_{max}$, $D'_{min}$ and $D'_{avg}$ are measured on the remaining 95% of the total number of spacings D'.

Usually the laser beam transmitted through the mask is focused through a converging lens, and therefore, the perforation spacings D' on the mask surface should be determined in consideration of the magnification of the converging lens so as to obtain the intended bump spacing D on the disc surface.

The perforation spacing D' variation expressed by the formula "$[(D'_{max} - D'_{min})/D'_{avg}] \times 100$ (%)" is preferably in the range of 10% to 150%.

In view of the magnetic recording properties of the resulting magnetic recording disc, the microscopic bumps formed on the substrate surface preferably have the following dimensions. The average diameter is usually in the range of 1 to 10 µm. If the average bump diameter is smaller than 1 µm, the CSS characteristics are not satisfactory. If the average bump diameter is larger than 10 µm, it is possible that the bumps give shocks to the magnetic head and the glide noise increases.

The average height of the microscopic bumps is usually in the range of 1 to 30 nm, preferably 10 to 30 nm. If the average bump height is smaller than 1 nm, the intended surface texturing effect cannot be attained. If the average bump height exceeds 30 nm, it is possible that, when the disc is rotated at a high speed, the bumps on the disc impinge on the head and a problem of head crash arises.

The average bump spacing D in the circumferential direction of the disc is usually in the range of 1 to 50 µm, preferably 10 to 50 µm. If the average bump spacing is smaller than 1 µm, a portion of the microscopic bumps are undesirably placed in contact with adjacent microscopic bumps. If the average bump spacing is larger than 50 µm, the glide noise tends to increase.

The areal percent of microscopic bumps on the substrate surface is not particularly limited, and can be varied usually in the range of 0.1 to 99.9% of the entire area of the substrate surface. A preferable areal percent of the bumps is in the range of 1 to 20%.

The substrate disc for a magnetic recording medium to be textured in the process of the present invention is not particularly limited provided that it is capable of being textured with a laser bean. As specific examples of the substrate disc, there can be mentioned a disc blank made of aluminum or an aluminum alloy such as an aluminum magnesium alloy, which has been plated with nickel-phosphorus (NiP), nickel-copper (NiCu) or cobalt-phosphorus (CoP), or which has been subjected to anodic oxidation; and a disc blank made of silicon or glass.

The surface-textured substrate disc may be washed with a solvent. On the surface-textured substrate disc, an undercoat such as a chromium layer, a magnetic coating, e.g., a CoCrTa alloy layer, a protective coating such as a carbon layer and a lubricating coating are usually formed in this order. Usually the magnetic coating-formed or lubricating coating-formed substrate is subjected to tape-burnishing to remove surface protrusions. The procedures, conditions and materials employed for forming these coatings are not particularly limited, and may be conventional.

The laser texturing treatment of the invention can be applied to not only a substrate disc on which a magnetic coating has not been formed yet, but also a substrate disc having a magnetic coating formed thereon or a substrate disc having a protective coating further formed thereon.

The present invention will now be described by the following examples that by no means limit the scope of the claims of the invention.

EXAMPLES 1 TO 5 AND COMPARATIVE EXAMPLES 1 TO 4

Laser Texturing Treatment

As a continuous wave (CW) laser source, a laser diode-pumped continuous wave YAG laser having an output of 5 watt, and a double wave mode with a wavelength of 532 nm was used. As an external laser-beam modulator, EOM having a maximum signal conversion of 85%, a rise-time of 15 n-sec, and an $I_{max}/I_{min}$ ratio of 80 (wherein $I_{max}$ is the maximum amplitude of pulse oscillating laser beam output and $I_{min}$ is the minimum amplitude of pulse oscillating laser beam output) was used. A wave-form generator as an external signal input device was connected to the EOM. The input wave-form to the EOM was a pulse wave-form having a pulse width of 150 n-sec. The pulse repetition frequency F of the pulse wave-form was set as shown in Table 1, by utilizing the frequency modulation function of the wave-form generator. The modulation of the frequency was effected by using a triangular wave of 1 kHz.

The laser beam was focused through a lens into a spot diameter of 5 μm on an NiP-plated aluminum substrate disc with a diameter of 95 mm, rotating at a constant speed (shown in Table 1) in the circumferential direction of the substrate disc and simultaneously moving in a radial direction at a speed of 1 mm/sec.

The thus-textured substrate disc has microscopic bumps having an average diameter of 5 μm. The average height and average density of the microscopic bumps, and the spacings D between adjacent bumps in the circumferential direction of the disc are shown in Table 1. The laser texturing was conducted at a zone width of 17 to 20 nm. The measurement of the bump spacings D were effected by using an auto-XY stage with a differential microscope (type "MSS-200", supplied by Chuou Seiki K.K., Japan).

For comparison, the above-mentioned laser-texturing procedures were repeated wherein the modulation of the pulse repetition frequency F was not conducted (Comparative Examples 1 to 4). The constant speed in the circumferential direction of the rotating substrate disc, the frequency of laser pulse, and the dimensions of microscopic bumps are shown in Table 1.

TABLE 1

| Ex-ample No. | Circum-feren-tial speed (m/sec) | Laser pulse frequency (kHz) | Bump spacings D | | Average bump density (No./mm²) | Average bump height (nm) |
|---|---|---|---|---|---|---|
| | | | Davg (μm) | Dmin–Dmax (μm) | | |
| Ex 1 | 8 | 200 | 50 | 40 | 32–53 | 1,250 | 18 |
| Ex 2 | 8 | 200 | 25 | 40 | 35–46 | 1,250 | 18 |
| Ex 3 | 8 | 200 | 50 | 40 | 32–53 | 1,250 | 14 |
| Ex 4 | 4 | 200 | 50 | 20 | 16–27 | 2,500 | 18 |
| Ex 5 | 8 | 100 | 50 | 80 | 53–160 | 625 | 18 |
| Co Ex 1 | 8 | 200 | 40 | — | 1,250 | 18 |
| Co Ex 2 | 8 | 200 | 40 | — | 1,250 | 14 |
| Co Ex 3 | 4 | 200 | 20 | — | 2,500 | 18 |
| Co Ex 4 | 8 | 100 | 80 | — | 625 | 18 |

Preparation of Magnetic Recording Medium

On each of the laser-textured aluminum disc blanks obtained in Examples 1 to 5 and Comparative Examples 1 to 4, a chromium under coat having a thickness of 100 nm, a CoCrTa alloy magnetic coating having a thickness of 20 nm, and then, a carbon protective coating having a thickness of 20 nm were formed in this order at a disc temperature of 200° C. by sputtering. Finally a perfluoro-polyether (PFPE) lubricating agent was coated thereon to give a magnetic recording medium.

Oscillation output of a magnetic head at a constant gain of amplifier was evaluated on the prepared magnetic recording mediums. The oscillation output of magnetic head was measured by using a glide tester (type "DS-4100" supplied by Sony-Tektronix Co.) with a 11 mil catamaran head. The measurement of the oscillation output of magnetic head was conducted at the natural frequency determined by the speed in the circumferential direction and the bump spacings, and also at the resonance frequency. The results are shown in Table 2.

TABLE 2

| | Oscillation output of head (mV) | | |
|---|---|---|---|
| Circumferential speed | Natural frequency 8 m/sec | | Resonance frequency 6.4 m/sec |
| Frequency | 200 kHz | 400 kHz | 200–800 kHz |
| Example 1 | 75 | 70 | 530 |
| Example 2 | 70 | 65 | 570 |
| Example 3 | 65 | 55 | 430 |
| Example 4 | 95 | 85 | 760 |
| Example 5 | 70 | 60 | 470 |
| Com. Ex. 1 | 160 | 150 | 1,270 |
| Com. Ex. 2 | 135 | 130 | 1,050 |
| Com. Ex. 3 | 205 | 190 | 1,530 |
| Com. Ex. 4 | 140 | 130 | 1,120 |

The CSS characteristics were expressed by the friction values as measured after 5,000 times of contact start-stop by using a CSS tester (type "KT 501" supplied by Koyo Seisakusho K.K., Japan). The rise-time was 4 sec, the fall-time was 4 sec, and the revolution speed was 5,400 rpm. The results are shown in Table 3.

TABLE 3

| Friction value after 5000 times CSS | |
|---|---|
| Example 1 | 0.38 |
| Example 2 | 0.45 |
| Example 3 | 0.52 |
| Example 4 | 0.50 |
| Example 5 | 0.54 |
| Co. Ex. 1 | 1.02 |
| Co. Ex. 2 | 1.08 |

TABLE 3-continued

| Friction value after 5000 times CSS | |
|---|---|
| Co. Ex. 3 | 1.25 |
| Co. Ex. 4 | 1.33 |

As seen from Table 2 and Table 3, in examples of the present invention, the natural frequency occurring due to the speed in the circumferential direction and the bump spacings was minimized. The natural frequency of magnetic head was 640 kHz, and thus, resonance frequency was observed to a considerable extent at 6.4 m/sec in the comparative examples. In contrast, the resonance frequency was minimized in examples of the present invention. Therefore, the magnetic recording medium of the present invention is beneficial in that the flying stability of a magnetic head is enhanced, the CSS characteristics are improved and the head noise is reduced. Further, the durability against wear due to a sliding contact of HD with a magnetic head is enhanced.

What is claimed is:

1. An improvement in a process for producing a magnetic recording medium comprising a step of focusing a laser beam for texturing a surface of a substrate disc to form a multiplicity of microscopic bumps on the disc surface, said improvement comprising focusing the laser beam in a manner such that spacings D between adjacent microscopic bumps in the circumferential direction of the substrate disc are varied to an extent such that the following formula (1) is satisfied:

$$1 \leq [(D_{max} - D_{min})/D_{avg}] \times 100(\%) \leq 200 \tag{1}$$

wherein $D_{max}$, $D_{min}$ and $D_{avg}$ are the maximum spacing, minimum spacing and average spacing, respectively, among the spacings D between adjacent microscopic bumps in the circumferential direction of the substrate disc, as determined by a method wherein 2.5% of the total number of spacings D, having the largest dimensions, and 2.5% of the total number of spacings D, having the smallest dimensions, are excluded, and $D_{max}$, $D_{min}$ and $D_{avg}$ are measured on the remaining 95% of the total number of spacings D.

2. The improved process for producing the magnetic recording medium according to claim 1, wherein said focusing of the laser beam onto the surface of the substrate disc is carried out while the pulse repetition frequency F of the laser beam is modulated in a manner such that the following formula (2) is satisfied:

$$0.01 \leq [(F_{max} - F_{min})/F_{avg}] \leq 100 \tag{2}$$

wherein $F_{max}$, $F_{min}$ and $F_{avg}$ are the maximum value, the minimum value and the average value, respectively, of the pulse repetition frequency F of the laser beam.

3. The improved process for producing the magnetic recording medium according to claim 2, wherein said focusing of the laser beam onto the disc surface is carried out while the substrate disc and a system for focusing the modulated laser beam are moved correlatively in the radial direction of the substrate disc, and while the substrate disc is rotated at a constant angular speed, or at a speed such that the focusing spot on the disc surface is moved in the circumferential direction of the substrate disc at a constant linear speed relative to the revolving substrate disc.

4. The improved process for producing the magnetic recording medium according to claim 1, wherein the laser beam is transmitted through perforations of a mask and then focused onto the surface of the substrate disc; spacings D' between the adjacent perforations in the circumferential direction of the mask being varied to an extent such that the following formula (4) is satisfied:

$$1 \leq [(D'_{max} - D'_{min})/D'_{avg}] \times 100(\%) \leq 200 \tag{4}$$

wherein $D'_{max}$, $D'_{min}$ and $D'_{avg}$ are the maximum spacing, minimum spacing and average spacing, respectively, among the spacings D' between adjacent perforations in the circumferential direction of the mask, as determined by a method wherein 2.5% of the total number of spacings D', having the largest dimensions, and 2.5% of the total number of spacings D', having the smallest dimensions, are excluded, and $D'_{max}$, $D'_{min}$ and $D'_{avg}$ are measured on the remaining 95% of the total number of spacings D'.

5. The improved process for producing the magnetic recording medium according to claim 1 wherein the laser beam is reflected by an optical system having mirrors working at a continuously varied reflection angle, and the reflected laser beam is focused onto the surface of the substrate disc wherein the reflection angle of the mirrors is controlled so that the bump spacing requirements expressed by the formula (1) are satisfied.

* * * * *